(12) United States Patent
Zhang et al.

(10) Patent No.: US 11,869,227 B2
(45) Date of Patent: Jan. 9, 2024

(54) IMAGE RECOGNITION METHOD, APPARATUS, AND SYSTEM AND STORAGE MEDIUM

(71) Applicant: Tencent Technology (Shenzhen) Company Limited, Shenzhen (CN)

(72) Inventors: Zi Jian Zhang, Shenzhen (CN); Zhong Qian Sun, Shenzhen (CN); Xing Hui Fu, Shenzhen (CN); Wei Yang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 323 days.

(21) Appl. No.: 17/225,861

(22) Filed: Apr. 8, 2021

(65) Prior Publication Data

US 2021/0224998 A1    Jul. 22, 2021

Related U.S. Application Data

(63) Continuation of application No. PCT/CN2019/115117, filed on Nov. 1, 2019.

(30) Foreign Application Priority Data

Nov. 23, 2018 (CN) .......................... 201811410221.0

(51) Int. Cl.
*G06V 10/00* (2022.01)
*G06V 10/764* (2022.01)
*G06T 7/11* (2017.01)
*G06T 7/174* (2017.01)
*G06N 3/08* (2023.01)
*G06T 7/00* (2017.01)
*G06V 10/82* (2022.01)

(52) U.S. Cl.
CPC ............. *G06V 10/764* (2022.01); *G06N 3/08* (2013.01); *G06T 7/0014* (2013.01); *G06T 7/11* (2017.01);
(Continued)

(58) Field of Classification Search
CPC .. G06V 10/764; G06V 10/82; G06V 2201/03; G06V 40/10; G06N 3/08;
(Continued)

(56) References Cited

U.S. PATENT DOCUMENTS 5,771,311 A * 6/1998 Arai ...................... H04N 1/6086
358/518
2017/0270674 A1 * 9/2017 Shrivastava ............ G06T 7/194
(Continued)

FOREIGN PATENT DOCUMENTS

| CN | 102609680 A | 7/2012 |
|----|-------------|--------|
| CN | 107886110 A | 4/2018 |
| CN | 109670532 A | 4/2019 |

OTHER PUBLICATIONS

Extended European Search Report for European Application No. EP 19886675.8 dated Aug. 26, 2021 (10 pages).
(Continued)

*Primary Examiner* — Van D Huynh
(74) *Attorney, Agent, or Firm* — Crowell & Moring LLP

(57) ABSTRACT

Image recognition may include obtaining a first image, segmenting the first image into a plurality of first regions by using a target model, and searching for a target region among bounding boxes in the first image that use points in the first regions as centers. The target region is a bounding box in the first image in which a target object is located. The target model is a pre-trained neural network model configured to recognize from an image, a region in which the target object is located. The target model is obtained through training by using positive samples with a region in which the target object is located marked and negative samples with a region in which a noise is located marked. The target region is marked in the first image to improve accuracy of target object detection in an image.

23 Claims, 9 Drawing Sheets

(52) U.S. Cl.
CPC .............. G06T 7/174 (2017.01); G06V 10/82 (2022.01); *G06T 2207/20081* (2013.01); *G06T 2207/20084* (2013.01); *G06T 2207/30032* (2013.01)

(58) Field of Classification Search
CPC ......... G06T 7/0014; G06T 7/11; G06T 7/174; G06T 2207/20081; G06T 2207/20084; G06T 2207/30032; G06F 18/214; G06F 18/23; G06F 18/24
USPC .......................................................... 382/100
See application file for complete search history.

(56) References Cited

U.S. PATENT DOCUMENTS

| | | |
|---|---|---|
| 2017/0330054 A1 | 11/2017 | Fu et al. |
| 2017/0337470 A1* | 11/2017 | DeTone ..................... G06T 7/12 |
| 2018/0315188 A1* | 11/2018 | Tegzes ...................... G06T 7/11 |
| 2019/0050981 A1* | 2/2019 | Song ..................... A61B 5/7267 |
| 2020/0057917 A1* | 2/2020 | Deng ....................... G06N 3/08 |
| 2021/0365732 A1* | 11/2021 | Lin .......................... G06T 7/11 |

OTHER PUBLICATIONS

M. Chen et al., "Massive Colonoscopy Images Oriented Polyp Detection," ICBBE, Nov. 12-14, 2018, Biomedical and Bioinformatics Engineering, Association for Computing Machinery (5 pp.).

Y. Shin et al., "Automatic Colon Polyp Detection Using Region Based Deep CNN and Post Learning Approaches," *IEEE Access*, vol. 6, published Aug. 15, 2018 (13 pp.).

International Search Report and Written Opinion received for Application No. PCT/CN2019/115117 dated Jan. 23, 2020 (English and Chinese languages) (10 pages).

* cited by examiner

| Layer | Network | Size | Input | | Output |
|---|---|---|---|---|---|
| 0 conv | 32 | 3 x 3 / 1 | 576 x 576 x 3 | -> | 576 x 576 x 32 |
| 1 max | | 2 x 2 / 2 | 576 x 576 x 32 | -> | 288 x 288 x 32 |
| 2 conv | 64 | 3 x 3 / 1 | 288 x 288 x 32 | -> | 288 x 288 x 64 |
| 3 max | | 2 x 2 / 2 | 288 x 288 x 64 | -> | 144 x 144 x 64 |
| 4 conv | 128 | 3 x 3 / 1 | 144 x 144 x 64 | -> | 144 x 144 x 128 |
| 5 conv | 64 | 1 x 1 / 1 | 144 x 144 x 128 | -> | 144 x 144 x 64 |
| 6 conv | 128 | 3 x 3 / 1 | 144 x 144 x 64 | -> | 144 x 144 x 128 |
| 7 max | | 2 x 2 / 2 | 144 x 144 x 128 | -> | 72 x 72 x 128 |
| 8 conv | 256 | 3 x 3 / 1 | 72 x 72 x 128 | -> | 72 x 72 x 256 |
| 9 conv | 128 | 1 x 1 / 1 | 72 x 72 x 256 | -> | 72 x 72 x 128 |
| 10 conv | 256 | 3 x 3 / 1 | 72 x 72 x 128 | -> | 72 x 72 x 256 |
| 11 max | | 2 x 2 / 2 | 72 x 72 x 256 | -> | 36 x 36 x 256 |
| 12 conv | 512 | 3 x 3 / 1 | 36 x 36 x 256 | -> | 36 x 36 x 512 |
| 13 conv | 256 | 1 x 1 / 1 | 36 x 36 x 512 | -> | 36 x 36 x 256 |
| 14 conv | 512 | 3 x 3 / 1 | 36 x 36 x 256 | -> | 36 x 36 x 512 |
| 15 conv | 256 | 1 x 1 / 1 | 36 x 36 x 512 | -> | 36 x 36 x 256 |
| 16 conv | 512 | 3 x 3 / 1 | 36 x 36 x 256 | -> | 36 x 36 x 512 |
| 17 max | | 2 x 2 / 2 | 36 x 36 x 512 | -> | 18 x 18 x 512 |
| 18 conv | 1024 | 3 x 3 / 1 | 18 x 18 x 512 | -> | 18 x 18 x 1024 |
| 19 conv | 512 | 1 x 1 / 1 | 18 x 18 x 1024 | -> | 18 x 18 x 512 |
| 20 conv | 1024 | 3 x 3 / 1 | 18 x 18 x 512 | -> | 18 x 18 x 1024 |
| 21 conv | 512 | 1 x 1 / 1 | 18 x 18 x 1024 | -> | 18 x 18 x 512 |
| 22 conv | 1024 | 3 x 3 / 1 | 18 x 18 x 512 | -> | 18 x 18 x 1024 |
| 23 conv | 1024 | 3 x 3 / 1 | 18 x 18 x 1024 | -> | 18 x 18 x 1024 |
| 24 conv | 1024 | 3 x 3 / 1 | 18 x 18 x 1024 | -> | 18 x 18 x 1024 |
| 25 route | 16 | | | | |
| 26 conv | 64 | 1 x 1 / 1 | 36 x 36 x 512 | -> | 36 x 36 x 64 |
| 27 reorg | | / 2 | 36 x 36 x 64 | -> | 18 x 18 x 256 |
| 28 route | 27 24 | | | | |
| 29 conv | 1024 | 3 x 3 / 1 | 18 x 18 x 1280 | -> | 18 x 18 x 1024 |
| 30 conv | 40 | 1 x 1 / 1 | 18 x 18 x 1024 | -> | 18 x 18 x 40 |
| 31 detection | | | | | |

FIG. 7

IMAGE RECOGNITION METHOD, APPARATUS, AND SYSTEM AND STORAGE MEDIUM

RELATED APPLICATION

This application claims priority to as a Continuation to PCT/CN2019/115117, entitled "IMAGE RECOGNITION METHOD, APPARATUS, AND SYSTEM AND STORAGE MEDIUM" filed on Nov. 1, 2019, which claims priority to Chinese Patent Application No. 2018114102210, entitled "METHOD, APPARATUS, AND SYSTEM FOR RECOGNIZING ABNORMALITY IN IMAGE OF ORGANIC TISSUE OF LIVING BODY" filed with the National Intellectual Property Administration, PRC on Nov. 23, 2018, both of which are incorporated herein by reference in their entirety.

FIELD OF THE TECHNOLOGY

This application relates to image recognition technology.

BACKGROUND OF THE DISCLOSURE

With the development of science and technology, the exploration of nature is not limited to the surface of things, but is more inclined to explore the interior of things. For example, it is required to detect for animal or plant objects in the nature whether there is an abnormality inside the animal or plant objects, for example, whether an abnormal lesion occurs inside the animals or plants.

Currently, to meet the requirement, whether there is an abnormality inside the animal or plant objects is detected manually according to images obtained by photographing the interior of the animal or plant objects. As limited by personal experience of relevant professionals, such a method of manually detecting whether there is a target object in an image is relatively inefficient and inaccurate.

For the foregoing problem, no effective solution has been provided at present.

SUMMARY

Embodiments of this application provide an image recognition method, apparatus, and system and a storage medium, to resolve at least the technical problem of relatively low accuracy of target object detection in the related art.

According to one aspect of the embodiments of this application, an image recognition method is provided, applicable to an electronic device, the method including: obtaining a first image; segmenting the first image into a plurality of first regions by using a target model, and searching for a target region among bounding boxes in the first image that use points in the first regions as centers; the target region being a bounding box in the first image in which a target object is located, the target model being a pre-trained neural network model configured to recognize from an image a region in which the target object is located, and the target model being obtained through training by using positive samples with a region in which the target object is located marked and negative samples with a region in which a noise is located marked; and marking the target region in the first image.

According to another aspect of the embodiments of this application, an electronic image recognition device includes a processor and a memory configured to store executable instructions of the processor. The processor is configured to execute the executable instructions to implement operations including obtaining a first image, and segmenting the first image into a plurality of first regions by using a target model, and searching for a target region among bounding boxes in the first image that use points in the first regions as centers. The target region comprises a bounding box in the first image in which a target object is located, wherein the target model is a pre-trained neural network model configured to recognize from an image a region in which the target object is located. The target model is obtained through training by using positive samples with a region in which the target object is located marked and negative samples with a region in which a noise is located marked. The operations include marking the target region in the first image.

According to another aspect of the embodiments of this application, an image recognition apparatus is further provided, including: a first obtaining unit, configured to obtain a first image; a search unit, configured to segment the first image into a plurality of first regions by using a target model, and search for a target region among bounding boxes in the first image that use points in the first regions as centers; the target region being a bounding box in the first image in which a target object is located, and the target model being a pre-trained neural network model configured to recognize from an image a region in which the target object is located; a mark unit, configured to mark the target region in the first image.

According to another aspect of the embodiments of this application, a storage medium is further provided. The storage medium includes a program stored therein, the program, when run, performing the foregoing method.

According to another aspect of the embodiments of this application, an electronic device is further provided. The electronic device includes a memory, a processor, and a computer program that is stored in the memory and executable on the processor, the processor performing the foregoing method by using the computer program.

In the embodiments of this application, the first image is segmented into the plurality of first regions by using the target model, the target region is searched for among the bounding boxes in the first image that use points in the first regions as centers, and the target region is marked in the first image, the target region being a bounding box in the first image in which the target object is located. The target model is obtained through training by using training images marked by mark information. The training images include the positive samples with a region in which the target object is located marked and the negative samples with a region in which a noise is located marked. Therefore, in the technical solutions of this application, the target object can still be accurately recognized by using the target model, even there is a noise in the first image, thereby avoiding information distortion caused by noise filtering performed on the first image, and improving accuracy of target object detection.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the drawings:

FIG. 7 is a schematic diagram of an abnormality recognition model according to an embodiment of this application.

DESCRIPTION OF EMBODIMENTS

To make a person skilled in the art better understand solutions of this application, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application fall within the protection scope of this application.

The terms such as "first" and "second" in the specification, the claims, and the foregoing accompanying drawings of this application are intended to distinguish between similar objects, but are not necessarily used for describing a particular sequence or a chronological order. It is to be understood that the data termed in such a way are interchangeable in proper circumstances, so that the embodiments of this application described herein can be implemented in orders other than the order illustrated or described herein. Moreover, the terms "include", "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to one aspect of the embodiments of this application, a method embodiment of image recognition is described herein.

Figure 1:
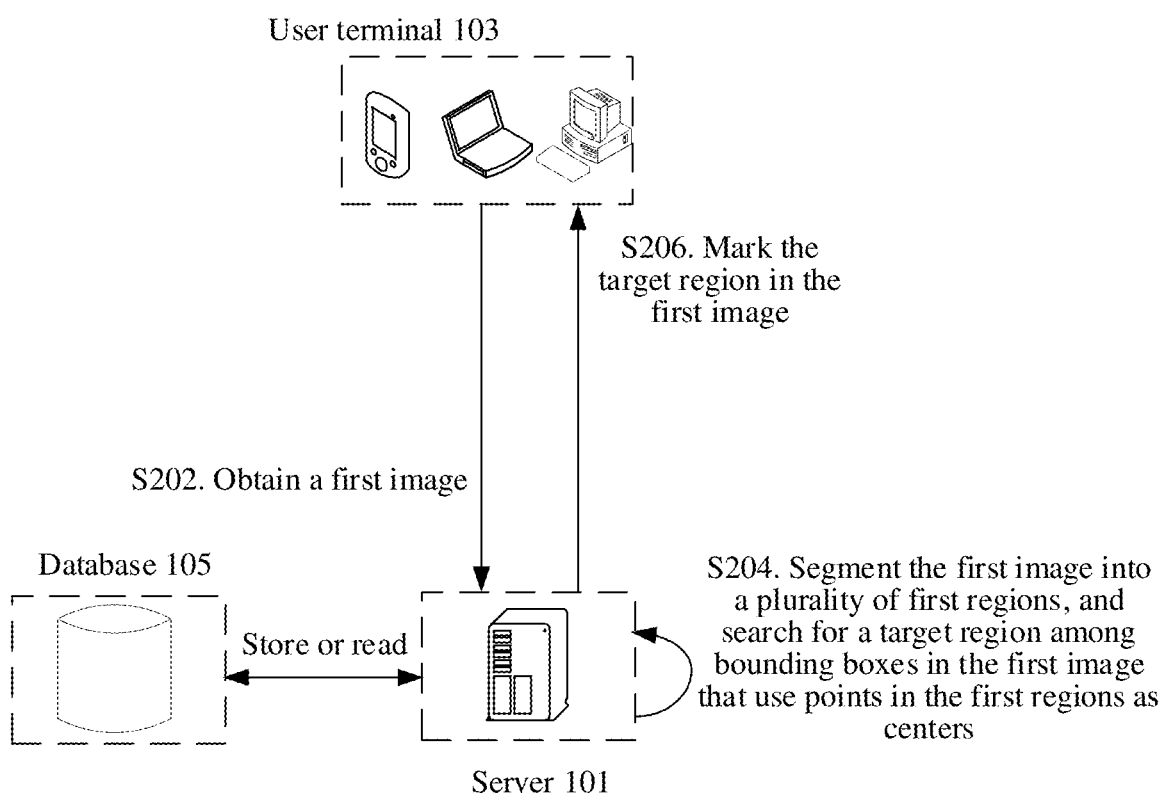
FIG. 1 is a schematic diagram of a hardware environment of an image recognition method according to an embodiment of this application.

In this embodiment, the image recognition method is applicable to a hardware environment including a server 101 and/or a terminal 103 shown in FIG. 1. As shown in FIG. 1, the server 101, connected to the terminal 103 through a network, may be configured to provide a service (for example, an application service or an abnormality detection service) for the terminal 103 or a client installed on the terminal 103. A database 105 may be configured on the server or independently of the server, to provide a data storage service for the server 103. The network includes, but is not limited to, a wide area network, a metropolitan area network, or a local area network. The terminal 103 is not limited to a PC, a mobile phone, a tablet computer, or the like.

Figure 2:
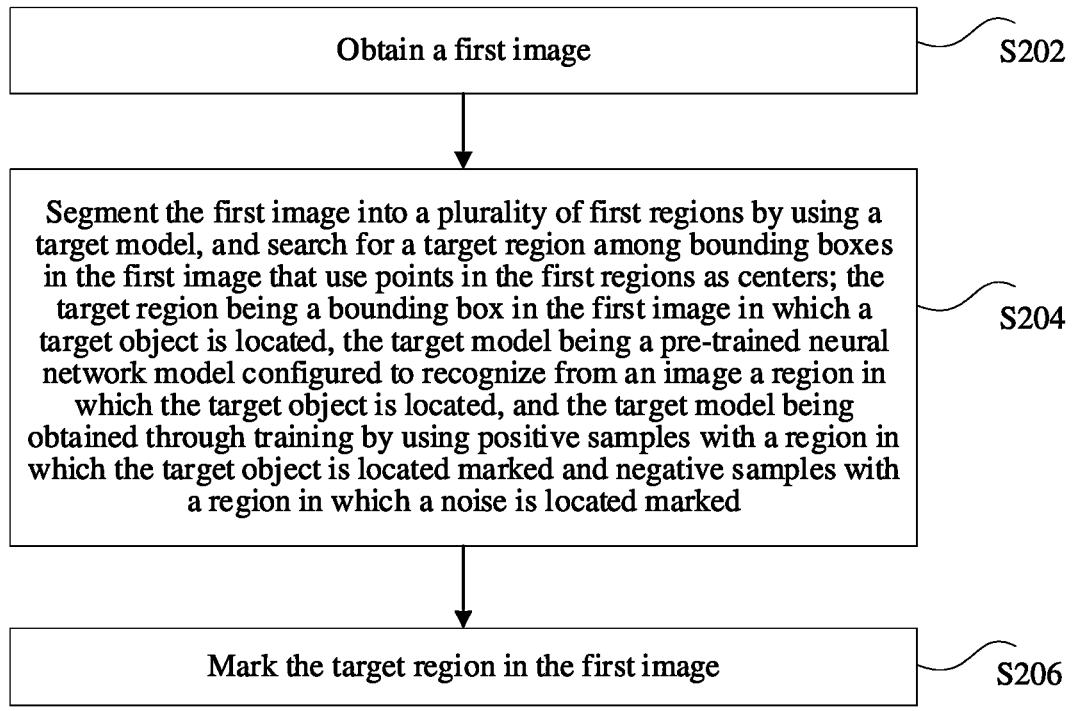
FIG. 2 is a flowchart of an image recognition method according to an embodiment of this application.

The image recognition method in this embodiment of this application may be performed by the terminal 103. The image recognition method in this embodiment of this application performed by the terminal 103 may be performed by the client installed on the terminal. FIG. 2 is a flowchart of an image recognition method according to an embodiment of this application. As shown in FIG. 2, the method may include the following steps:

Step S202: A terminal obtains a first image.

The first image may be a single image shot by using a visible-light camera, an infrared camera, X-rays, CT, a perspective manner, or the like. Alternatively, the first image may be an image frame in a video stream shot in the foregoing manner. The first image may be an image obtained by photographing a living body in the foregoing manner. The living body may be, for example, a human, an animal, or a plant.

Step S204: The terminal segments the first image into a plurality of first regions by using a target model, and searches for a target region among bounding boxes in the first image that use points in the first regions as centers, the target region being a region in the first image in which the target object is located, the target model being a pre-trained neural network model configured to recognize from an image a region in which the target object is located, and the target model being obtained through training by using positive samples with a region in which the target object is located marked and negative samples with a region in which a noise is located marked.

The target model may be trained in advance, and may be configured to recognize an abnormal part of organic tissue of a living body. When the target model is used to recognize an abnormal part in organic tissue, it is assumed that internal features of an abnormal living object is different from internal features of a normal living object, and a "feature set" of a normal living object and/or a "feature set" of an abnormal living object is created according to the concept. In the target model, when abnormality detection is performed inside a living object of a living body, features of the current living object are compared with the "feature set" of the normal living object and/or the "feature set" of the abnormal living object. When a result disobeys a statistics rule, for example, matching the "feature set" of the abnormal living object, it is considered that there may be an abnormality inside the living object.

The target model may be a deep neural network model, such as a you only look once (YOLO) neural network model, or a deep learning neural network for target detection. The first image may be segmented into a plurality of first regions in a regular shape, such as a square or a rectangle. The objective of segmenting the first image into the plurality of first regions in the regular shape is to determine, in each first region, whether there is an abnormal part in a bounding box using a point in the first region as a center point. The bounding box may also be a region in a regular shape, such as a square, a rectangle, a circle, or a rhombus.

Because training images used during training of the target model include negative samples including noise data generated due to an environmental reason, the trained target model is capable of recognizing noises in various scenarios, which can avoid recognizing a scene noise as a region in which the target object is located, thereby improving the use stability, robustness, and reliability in various scenarios.

In the embodiment described in step S204, when the target model is used to recognize an abnormal part of organic tissue of a living body, the abnormal part may be a part of a particular abnormality type, or one of a plurality of abnormality types. The first image is segmented into the plurality of first regions by using the target model, and the target region is searched for among the bounding boxes in the first image that use points in the first regions as centers. In other words, positioning and classification of the abnormal part are performed through a model (that is, the target model), which are not separated, so that problems of information distortion and error amplification caused by a plurality of modules or layers can be resolved. In addition, the structure of the model is simpler, making it easy to use and maintain. The single model has higher processing efficiency, ensures the smoothness of a video frame rate, and has advantages of high real-time performance and high availability.

Step S206: The terminal marks the target region in the first image, so that a user sees the region and determine the target object recognized by the target model.

The terminal may be a medical device for diagnosis, or may be remote user equipment assisting diagnosis, such as a mobile terminal (for example, a mobile phone or a tablet) or a personal computer (PC) used by the user.

The target region is marked in the first image. If there is only one abnormality type, the target region is framed directly. If there are a plurality of abnormality types, in addition to framing target regions, an abnormality type of an abnormal part in each target region and a confidence level of the abnormality type may be further informed.

To frame the target region, the target model needs to determine position coordinates of the target region and abnormality type information. In other words, the target model needs to perform positioning and classification simultaneously, which means that positioning and classification in this application are implemented through the same model (that is, the target model).

As described above, the technical embodiment described in step S202 to step S206 in this application is applicable to abnormality detection of a living object of animals or plants, such as recognition of a tumor inside an animal. When a doctor performs diagnosis, step S202 to step S206 may be performed to detect a tumor in a video obtained by scanning an internal part of a human body and mark a region in which the tumor is located in an image frame, to facilitate the diagnosis of the doctor. Similarly, an abnormal part inside an animal, a plant, or the like can be detected through the foregoing embodiment.

The foregoing embodiment is described by using an example that the image recognition method is performed by the terminal 103. The target model may be integrated in a system of the terminal 103 in an offline form, or installed on the terminal in an application form. The terminal may recognize an abnormality in an offline form.

Alternatively, the image recognition method in this embodiment of this application may be performed jointly by the server 101 and the terminal 103. The target model may be configured on the server 101. The terminal 103 may call the server through an official account (such as an official account in an instant messaging application), a web page, an application, a mini program, or the like to provide a service by using the target model configured on the server. For example, the user may follow an official account of the service, and transmit a video stream shot after entering the official account to the server 101, to provide an image frame that needs to be processed to the server 101. The server returns a recognition result to the terminal to assist the user in determining an abnormality.

Through step S202 to step S206, the first image is segmented into the plurality of first regions by using the target model, the target region is searched for among the bounding boxes in the first image that use points in the first regions as centers, and the target region is marked in the first image, the target region being a bounding box in the first image in which the target object is located. The target model is obtained through training by using the positive samples with a region in which the target object is located marked and the negative samples with a region in which a noise is located marked. Therefore, in the technical embodiment of this application, the target object in the first image can still be accurately recognized by directly using the target model, even there is a noise, thereby resolving the technical problem of relatively low accuracy of target object detection in the related art, and improving accuracy of the target object detection.

The following further describes one embodiment of this application in detail with reference to the steps shown in FIG. 2 by using an example that the method provided in this embodiment of this application is used to detect an abnormal part of organic tissue of a living body.

In one embodiment provided in step S202, a user may download an application assisting determining on a mobile terminal, and open the application when abnormality detection needs to be performed. The application acquires a video stream through a camera on the mobile terminal, and transmits the video stream to a server. The server obtains a first image frame from the video stream. The first image frame is an image that is obtained by photographing the living body and that includes the organic tissue of the living body and may also be referred to as the first image.

In one embodiment provided in step S204, the first image frame is segmented into a plurality of first regions by using a target model, and a target region is searched for among bounding boxes in the first image frame that use points in the first regions as centers. The target region is a region in which the abnormal part of the organic tissue of the living body is located among the bounding boxes in the first image frame. The target model is a pre-trained neural network model configured to recognize from an image frame a region in which the abnormal part of the organic tissue is located.

The target model may be trained in advance or may be trained during use. An model training embodiment includes the following step 1 and step 2.

Step 1: Obtain training images that include positive samples with a region in which the abnormal part is located marked and negative samples with a region in which a noise is located marked, the noise being generated when an internal part of the living object is photographed.

Step 2: Train parameters in an original model by using the training images to obtain a recognition model configured to recognize the abnormal part, the recognition model including the target model.

The "training parameters in an original model by using the training images to obtain a recognition model configured to recognize the abnormal part" in step 2 further includes:

Step 2b: Input color data of the training images into the original model, and train the parameters in the original model by using the color data of the training images.

The training the parameters in the original model by using the color data of the training images includes: determining image features for describing the abnormal part by using the color data of the training images, the image features herein referring to a color feature, a texture feature, a shape feature, a spatial relationship feature, and the like, for example, for a texture, a region with a relatively loose structure in a mountain is abnormal, and a texture of the loose interior of the mountain photographed is a texture learned by the model; in another example, the color of a cancerous part inside a human body is usually different from that of surrounding tissue, thus forming a distinct texture, and the texture is a texture learned by the model; and determining values of the parameters in the original model that correspond to a case that in a fully connected layer of the original model, the image features are used as an input and regions in the training images in which the abnormal part is located are used as an output. Each layer inside the model may be understood as a to-be-initialized function (there may be one or more functions). An input of the function is an output of a function on a previous layer (an input of the first layer is color data X). An output Y of the last layer is information for representing the abnormal part. Using the plurality of training images means providing a plurality of groups of X and Y, to solve parameters of the functions in a fitting manner, to complete the foregoing training.

In this embodiment of this application, the original model includes two parts of neural networks. One part is a neural network for abnormality recognition and positioning using image features. The other part is a neural network for image feature extraction. The neural network for image feature extraction and the neural network for abnormality recognition and positioning using the image features may be trained together or the latter may be trained independently.

In a training example, the determining image features for describing the abnormal part by using the color data of the training images includes: setting values of parameters in a convolutional layer in the original model the same as values of parameters in a convolutional layer in a pre-trained feature extraction model, for example, the feature extraction model is trained by using some open source projects, such as ImageNet, which is a computer vision system recognition project and at present is a largest database for image recognition in the world, is established for simulating the recognition system of humans, and can recognize features such as an object in a picture, where the first few layers of the feature extraction model (such as a YOLO model) may be pre-trained by using the ImageNet dataset, and the original model is then initialized through a transfer learning technology by using parameters of the pre-trained network (such as a YOLO target detection network), which allows the final trained model to have a higher accuracy, recall rate, and mAP (an evaluation index); and extracting the image features for describing the abnormal part from the color data of the training images through the convolutional layer of the original model.

In an embodiment, when the parameters in the original model are trained by using the color data of the training images, not only weight parameters on layers in the original model are obtained through fitting, but also length and width parameters of the bounding box are determined in the following manner.

Step 2b1: Obtain a plurality of groups of region parameters corresponding to a plurality of positive samples, each group of region parameters being used for describing a third region marked by the mark information in a positive sample in which the abnormal part is located, the region parameters including a first parameter used for representing a center point of the third region, a second parameter used for representing a length of the third region, and a third parameter used for representing a width of the third region. The length parameter of the bounding box can be obtained through fitting by using a plurality of second parameters. The width parameter of the bounding box can be obtained through fitting by using a plurality of third parameters.

Step 2b2: Translate, for the plurality of groups of region parameters, center points in all the region parameters into the same point (such as the origin) in a two-dimensional coordinate system for processing together, perform, for the translated center points in the region parameters, the same translation on the second parameters and the third parameters in the region parameters (that is, the distance and direction of movement along the X direction and Y direction are the same as that of the first parameter), cluster, after the translation, a plurality of second parameters in the plurality of groups of region parameters into a plurality of first datasets (that is, cluster second parameters close in position into the same dataset), referring to FIG. 3 where each point on the X-axis corresponds to a second parameter, and each dashed-line box corresponds to a first dataset, and cluster a plurality of third parameters in the plurality of groups of region parameters into a plurality of second datasets (that is, cluster third parameters close in position into the same dataset).

The clustering a plurality of second parameters in the plurality of groups of region parameters into a plurality of first datasets includes processing all the second parameters in the following manner: obtaining a target parameter in the plurality of second parameters, the target parameter being an unprocessed second parameter in the plurality of second parameters; creating a parameter set that includes the target parameter and a second parameter associated with the target parameter in the plurality of second parameters when the target parameter is a core parameter, a quantity of second parameters whose distances to the core parameter are within a first threshold being not less than a second threshold, and finding all second parameters density reachable from the core parameter to form a first dataset; and if the target parameter is an edge parameter (non-core parameter), skipping to search for a next second parameter, until all the second parameters are processed.

If a second parameter a is in an ε-neighborhood of another second parameter b, and b is a core living object, the living object a is directly density reachable from the living object b. Assuming that among the plurality of second parameters b1, b2 . . . , and bn, b=b1, and a=bn, if bi is directly density reachable from bi−1, b is directly density reachable from the living object a.

If a second parameter in a ε-neighborhood (assuming that a region of the parameter whose radius is within ε is referred to as an ε-neighborhood of the parameter) of the target parameter is greater than or equal to MinPts (a parameter that is set greater than 1, that is, the second threshold), the parameter is referred to as a core parameter.

Similarly, the third parameters may be clustered in the foregoing manner.

Step 2b3: Obtain a fourth parameter in each of the plurality of first datasets and a fifth parameter in each of the plurality of second datasets, the fourth parameter being used for representing a center of the first dataset, and the fifth parameter being used for representing a center of the second dataset.

Step 2b4: Use the fourth parameter as a parameter in the original model used for representing a length of a recognized region in which the abnormal part is located, and use the fifth parameter as a parameter in the original model used for representing a width of the recognized region in which the abnormal part is located. In other words, a value of a center of each first dataset may be used as a value of the length of the bounding box, and a value of a center of each second dataset may be used as a value of the width of the bounding box. Then a quantity of combination manners for the size of the bounding box is the product of a quantity m of the first datasets and a quantity n of the second datasets.

In another embodiment, when the parameters in the original model are trained by using the color data of the training images, not only weight parameters on layers in the original model are obtained through fitting, but also length and width parameters of the bounding box are determined in the following manner.

Step 2b5: Obtain a plurality of groups of region parameters corresponding to a plurality of positive samples, each group of region parameters being used for describing a third region marked by the mark information in a positive sample in which the abnormal part is located, the region parameters including a first parameter used for representing a center point of the third region, a second parameter used for representing a length of the third region, and a third parameter (such as a value of the X-axis) used for representing a width of the third region. The length parameter (such as a value of the Y-axis) of the bounding box can be obtained through fitting by using a plurality of second parameters. The width parameter of the bounding box can be obtained through fitting by using a plurality of third parameters.

Step 2b6: Translate, for the plurality of groups of region parameters, center points in all the region parameters into the same point (such as the origin) in a two-dimensional coordinate system for processing together, and perform, for the translated center points in the region parameters, the same translation on the second parameters and the third parameters in the region parameters (that is, the distance and direction of movement along the X-direction and Y-direction are the same as that of the first parameter). After the translation, each region parameter may correspond to a to-be-fitted point in the two-dimensional coordinate system. An X-axis coordinate of the to-be-fitted point is a translated second parameter or a translated third parameter, and a Y-axis coordination is a translated third parameter or a translated second parameter. Then all to-be-fitted points may be fitted into a plurality of point sets.

Figure 4:
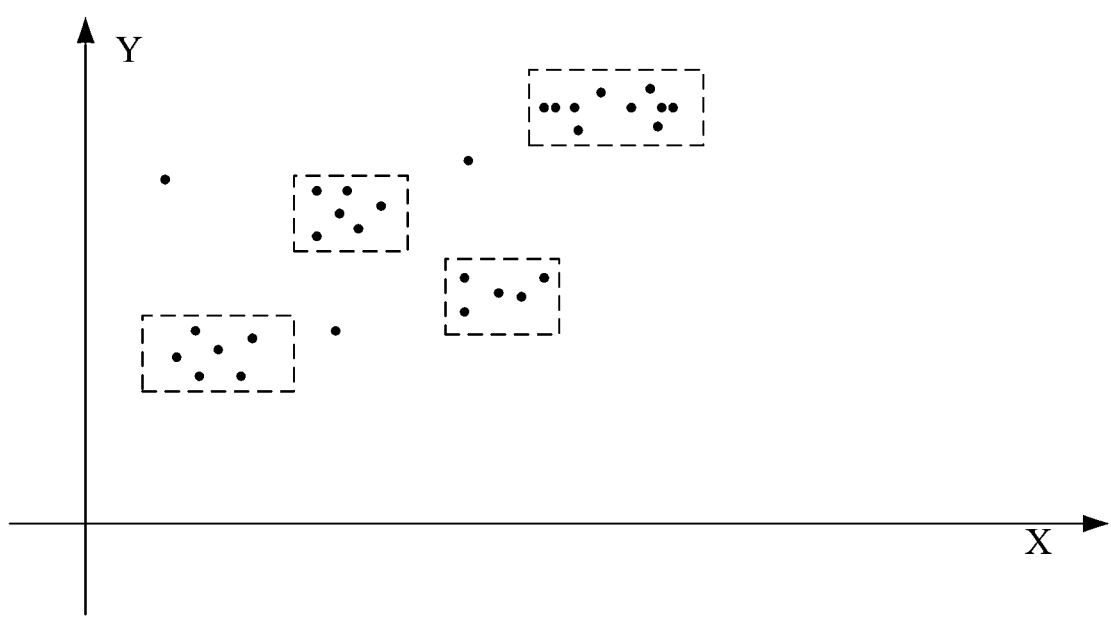
FIG. 4 is a schematic diagram of data clustering according to an embodiment of this application.

The fitting manner is similar to the foregoing fitting manner for the second parameters: defining a first threshold representing a distance and a second threshold representing a minimum quantity of neighboring points, and performing fitting in the foregoing manner. Refer to FIG. 4 for a fitting result. Each dashed-line box represents a point set. Points in the set are to-be-fitted points.

Step 2b7: Obtain a center of each of the plurality of point sets.

Step 2b8: Use a larger value of an X-axis coordinate and a Y-axis coordinate of a center point of the point set as a length of a recognized region in which the abnormal part is located (that is, a length of a bounding box) and use a smaller value of the X-axis coordinate and the Y-axis coordinate of the center point of the point set as a width of the recognized region in which the abnormal part is located (that is, a width of the bounding box). In other words, values of the center of each point set may be used as a group of values of the length and width of the bounding box. Then a quantity of combination manners for the size of the bounding box is a quantity of the point sets.

Step 2b9: Determine whether a quantity of used training images reaches a specified threshold.

Step 2b10: If the quantity of used training images has not reached the specified threshold, continue to input color data of training images into the original model, and train the parameters in the original model by using the color data of the training images.

Step 2b11: If the quantity of used training images reaches the specified threshold, use color data of a verification image as an input of the trained original model to verify whether the original model has a recognition capability.

Step 2b12: Use the trained original model as the recognition model when a second region recognized by the trained original model in the verification image after the color data of the verification image is used as the input of the trained original model matches a marked region in the verification image, the second region being recognized by the trained original model in the verification image as a region in which the abnormal part inside the living object is located, and the marked region being a region marked in the verification image in which the abnormal part inside the living object is actually located.

Step 2b13: Continue to train, when the second region recognized by the trained original model in the verification image after the color data of the verification image is used as the input of the trained original model does not match the marked region, the parameters in the original model by using color data of the positive samples and color data of the negative samples, until the second region recognized by the trained original model in the verification image after the color data of the verification image is used as the input of the trained original model matches the marked region.

In the foregoing embodiment, a resolution of the training images used during training is the same as a resolution of the image frame in the video stream during recognition. The foregoing embodiment is described by using an example that image frames in the video stream have a fixed resolution. In other words, the training images of the same resolution are used for training. To improve the adaptability of the technical embodiment of this application to images of different resolutions, when the parameters in the original model are trained by using the training images to obtain a recognition model for abnormal part recognition, parameters in a plurality of original models may be trained by using training images of a plurality of resolutions to obtain a plurality of recognition models corresponding to the plurality of resolutions, each recognition model being obtained through training by using training images of one resolution, and resolutions of training images used during training of any two recognition models being different. In other words, each model is configured to recognize image frames of only one resolution (that is, a resolution of training images used during training).

After training in the foregoing manner, in a process of performing step S204, when the first image is segmented into a plurality of first regions by using a target model, a target model matching a resolution of the first image (for example, a resolution of the target model is the same as that of the first image, or the resolution of the target model is closest to that of the first image) is selected from the plurality of recognition models, and the first image is segmented into a plurality of first regions by using the target model. When the target region is searched for among the bounding boxes in the first image that use points in the first regions as centers, a plurality of fourth regions found by the target model in all the bounding boxes are obtained, the fourth region being recognized by the target model in the first image as a region in which the abnormal part of the organic tissue of the living body is located.

Because abnormality types of abnormal parts are quite confusing, for one region whose type is difficult to distinguish, the model is inclined to generate several different fourth regions. To improve actual user experience, when the plurality of fourth regions include fourth regions whose centers are spaced no more than a third threshold (a preset threshold), a region with a highest confidence level in the fourth regions whose centers are spaced no more than the third threshold is used as a target region, that is, only one with the highest confidence level is retained among neighboring fourth regions overlapped or superposed (the confidence level is a parameter representing credibility, which is outputted by the model); and a fourth region whose center is spaced from a center of any other fourth region more than the third threshold is used as a target region.

In the technical embodiment provided in step S206, the target region is marked in the first image, and an abnormality type of the abnormal part in the target region and a confidence level of the abnormality type are marked, so that the user sees the region and determine the abnormal part recognized by the target model.

In an embodiment, an example that the technical embodiment of this application is applied to abnormality detection for a malignant tumor is used for description. Abnormality detection for mountains, rivers, plants, and other living objects is similar thereto, which is not repeated herein.

Currently, according to statistics of organizations, among malignant tumors of high incidence in China, the colon cancer usually ranks top 5 with respect to the incidence and the case fatality rate. However, on one hand, with the growth of the population in China and the increasingly severe aging problem, load of the health care system in China becomes heavier. A miss or an error easily occurs during diagnosis when doctors face large numbers of medical images generated constantly. On the other hand, due to unbalanced region development, medical resources are distributed extremely unbalanced in China. High-level doctors are gathered in large grade A tertiary hospitals in big cities. Levels of hospitals in other regions are uneven. Consequently, patients are easy to be diagnosed and treated incorrectly.

Figure 5:
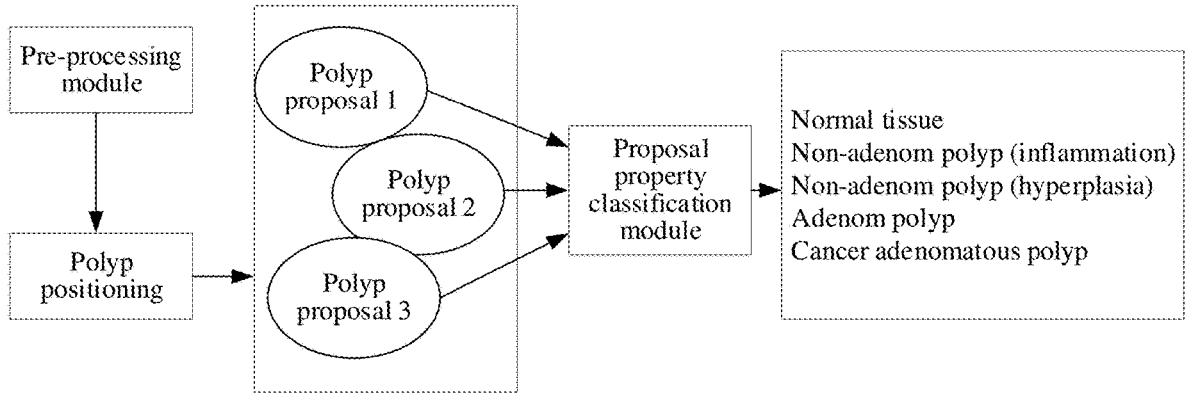
FIG. 5 is a schematic diagram of an abnormality recognition solution according to an embodiment of this application.

To resolve the foregoing problem, in an embodiment, as shown in FIG. 5, an image may be pre-processed by a white light narrow band imaging (NBI) or other pre-processing modules. Then an image-aided diagnosis system detects a position of a polyp, that is, a polyp proposal, based on a sliding window solution. Then the property of the polyp is obtained through a classification method of a proposal property classification module (for example, a support vector machine (SVM)). When a deep convolutional neural network (CNN) is used, the polyp property classification module is basically substituted by the CNN, and positioning in a natural image may be performed by using an embodiment in which a bounding box is generated such as by a selective search algorithm or a region proposal network.

The foregoing technical embodiment (a solution in which abnormal part positioning and classification are separated) may have the following disadvantages: 1) A positioning phase has to be separated from a classification phase. However, the effect of the classification phase depends much on recall of polyp positioning. The separation results in that features of the entire image cannot be obtained in the classification phase. 2) A plurality of layers and modules are used, which may gradually increase an error and information distortion layer by layer. In the foregoing technical embodiment, the polyp detection process is usually segmented and assigned to several sub-modules. Negative impacts such as information distortion and error amplification exist between the sub-modules and become severer with the increase of modules and layers. 3) Processing efficiency and real-time performance are poor. The foregoing technical embodiment basically does not meet the real-time requirement. Especially serial transmission between a plurality of modules significantly prolongs the processing time. 4) The model is complex. The foregoing embodiment may be relatively technically complex, which may increase the tracing difficulty, making it inconvenience in daily use, maintenance, and evaluation. 5) The production environment and robustness are poor. In the foregoing embodiment, many irrelevant or low-quality noise data occurring in actual scenarios are mostly artificially ignored, causing high rates of misjudgment and false positive or even failure in actual application in hospitals.

In another embodiment of this application, an end-to-end colon polyp positioning and property determining method is provided. The method, by using an end-to-end network, may have the following advantages: 1) Positioning and classification are not separated, which share the same network and are not processed one by one. 2) A single network model is used, which resolves the problems of information distortion and error amplification caused by a plurality of modules or layers. The model is simpler, making it easy to use and maintain. 3) High real-time performance and high availability are achieved. The single model has higher processing efficiency, and ensures the smoothness of a video frame rate. In addition, the following special optimization points are provided: 1) anchor box optimization, which is an anchor box parameter initialization method based on density-based spatial clustering of applications with noise (DBSCAN) (instead of K-means); and 2) an adaptive multi-scale prediction network, configured to select, according to features of an image, a suitable preload model for prediction.

The method provided in this application is an end-to-end colon polyp positioning and property determining method. When a doctor inspects a polyp by using an endoscope, a position of the polyp can be found and positioned in real time by merely transmitting a video stream to the mentioned end-to-end network, and the property of the polyp can be obtained at the same time. The technology and method in these embodiments can provide the following functions and benefits: 1) assisting a doctor in discovering and positioning a polyp to avoid a miss during diagnosis; and 2) assisting the doctor in determining the property of the polyp to improve the determining accuracy.

Compared with other solutions, the technology and method in the embodiments of this application can effectively assist a doctor with diagnosis by using a relatively simple, high real-time performance, and high-availability model (involving less modules) while ensuring a relatively good detection effect, which can achieve better effects and performance through some special optimization operations, making it an end-to-end colon detection solution (including positioning, or positioning and property determining) that can be directly applied to a hospital production environment.

The embodiment of this application is described in detail in the following. An objective of this application is to assist a doctor in discovering and positioning a polyp by using a relatively simple, high real-time performance, and high-availability model, and obtaining the property and type of the polyp.

Figure 6:
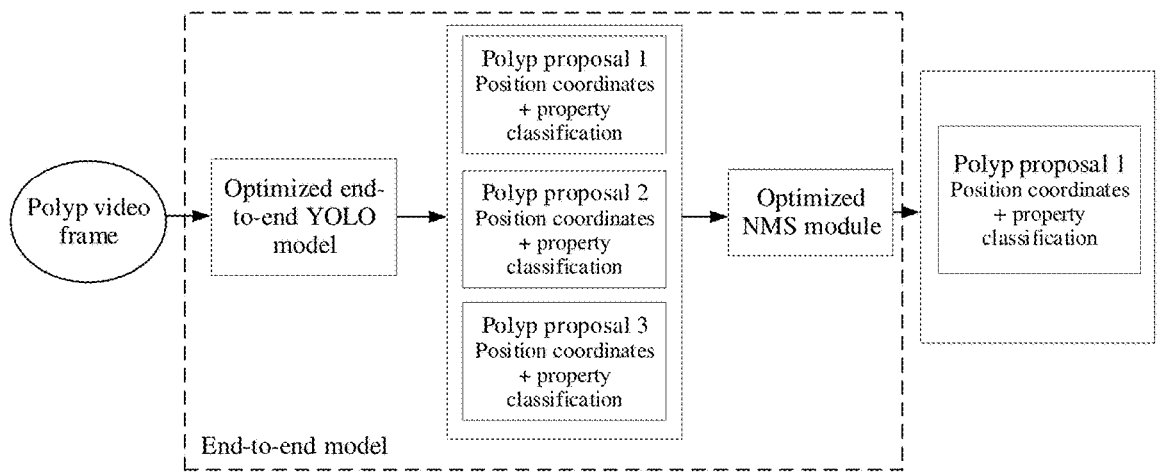
FIG. 6 is a schematic diagram of an abnormality recognition solution according to an embodiment of this application.

An overall architecture, that is, an end-to-end target model, of one embodiment of this application is shown in FIG. 6. When property classification comes to a single category, the solution is a polyp positioning solution. When property classification comes to a plurality of categories (for example, three categories: non-adenoma, adenoma, and adenocarcinoma), through the end-to-end solution, position coordinates can be predicted and the type of the polyp can be finely classified.

Considering the requirements for high availability and high real-time performance, the module performs detection and positioning on the polyp by using an optimized YOLO end-to-end model. YOLO transforms a target detection issue into an issue of bounding box coordinate and category probability regression. Compared with algorithms such as Faster R-CNN, YOLO is a one-stage target detection algorithm, which can obtain both position coordinates and category probabilities of the boxes by running a forward network once. Therefore, while ensuring certain detection accuracy, YOLO has prediction performance and efficiency far higher than those of other two-stage target detection algorithms. An optimized non-maximum suppression module is used to perform non-maximum suppression optimization. The frame rate can exceed 40 fps. Therefore, the high real-time performance requirement of an actual hospital production environment can be totally meet.

In one embodiment of this application, a network structure used is shown in FIG. 7, including 32 layers. The layer may be a convolutional layer, a pooling layer max, a fully connected layer detection, or the like. Based on the network model of this application, this application provides the following several optimization methods:

A training optimization embodiment is based on an anchor box parameter initialization method based on DBSCAN.

Figure 3:
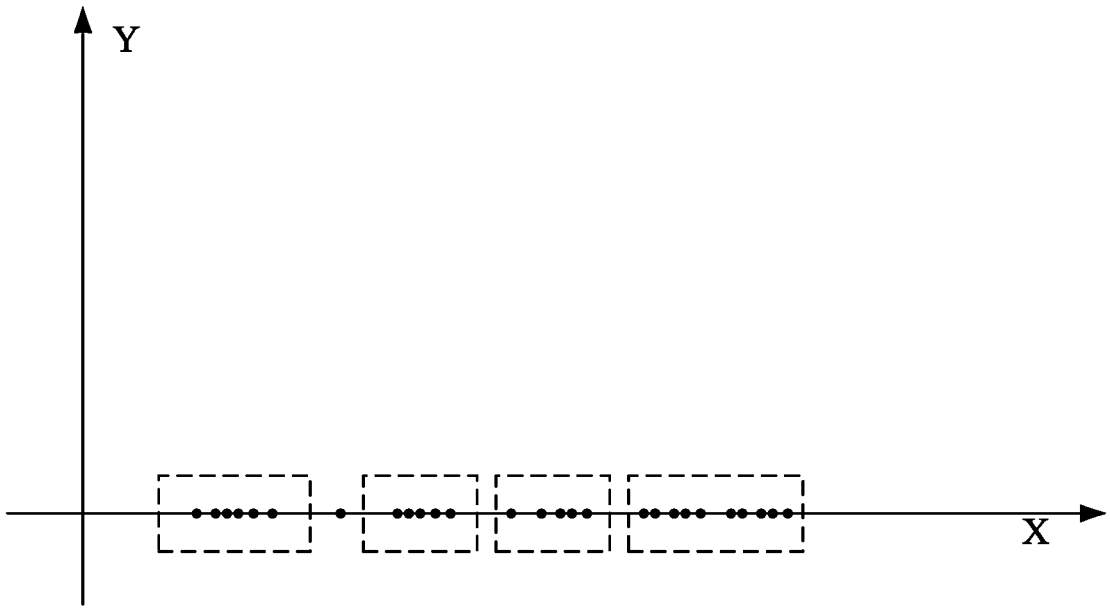
FIG. 3 is a schematic diagram of data clustering according to an embodiment of this application.

In the related art, anchor boxes are obtained through clustering by using the K-means algorithm. However, in this application, the DBSCAN algorithm is used for implementation. Compared with the DBSCAN algorithm, K-means may have the following disadvantages: 1) K-means needs to determine a quantity of clusters, while DBSCAN needs only parameters of a second threshold minPts and a first threshold eps to automatically determine the quantity of clusters. 2) K-means is susceptible to the impact of noise points, while DBSCAN can recognize noise points and can be immune to noises, as shown in FIG. 3 and FIG. 4. 3) K-means is largely affected by selection of an initial point and a cluster shape, while DBSCAN is not bothered by such problems and has higher adaptability. 4) DBSCAN is a density-based clustering algorithm and needs to compute distances between points (neighborhood computing). The issue of polyp positioning can be transformed into an intersection over union (IOU) (a metric for measuring accuracy of detection of a corresponding object in a particular dataset) between polyp boxes. Therefore, the following distance metric formula can be used:

$$d(box, centroid) = 1 - IOU(box, centroid)$$

where the parameters minPts and eps of DBSCAN can be obtained manually or through a neighborhood algorithm k-Nearest Neighbor (kNN), box represents a proposal, centroid represents a center point, and IOU ( ) represents solving.

The DBSCAN-based anchor box method provided in this application may further be applied to other deep learning algorithms (for example, Faster R-CNN) using anchor boxes. In some polyp datasets, especially when a box size is not marked well, the parameter initialization method has relatively good performance.

Training optimization includes pre-training and multi-scale training.

ImageNet is a computer vision system recognition project and at present is a largest database for image recognition in the world, which is established for simulating the recognition system of humans, and can recognize an object from a picture. The first few layers of the YOLO model are pre-trained by using the ImageNet dataset. The YOLO target detection network is then initialized by using parameters of the pre-trained network, which allows the final model to have a higher accuracy, recall rate, and mAP.

A range of YOLO multi-scale training is [320, 608]. With reference to actual features of colon polyp endoscope data, the multi-scale training range can be slightly adjusted to [320, 800] to enable the model to have better adaptability to an actual medical device.

By initializing the parameters of the target detection network by using the model trained by a dataset including a large number of high-quality marks, such as ImageNet, in combination with the multi-scale training technology, the model can skip a local optimal solution, and better converge to a global optimal solution.

Training optimization is robustness training.

In the related art, in most solutions, a pre-processing module is added before a polyp discovering and positioning module to filter out a noise.

Because adding the pre-processing module increases quantities of sub-layers and sub-modules, there may be problems of error transmission and amplification. In one embodiment of this application, noise data (including overexposure, flare noise, random noise, and the like) is directly added to the training set like a normal polyp image, which is used as negative samples for end-to-end training, to reduce layers to avoid error transmission and amplification. An actual final use effect is desired.

An service optimization is using the NMS algorithm.

There are S*S bounding boxes outputted by the YOLO model. The boxes need to be de-duplicated and combined by using an NMS algorithm module.

Figure 8:
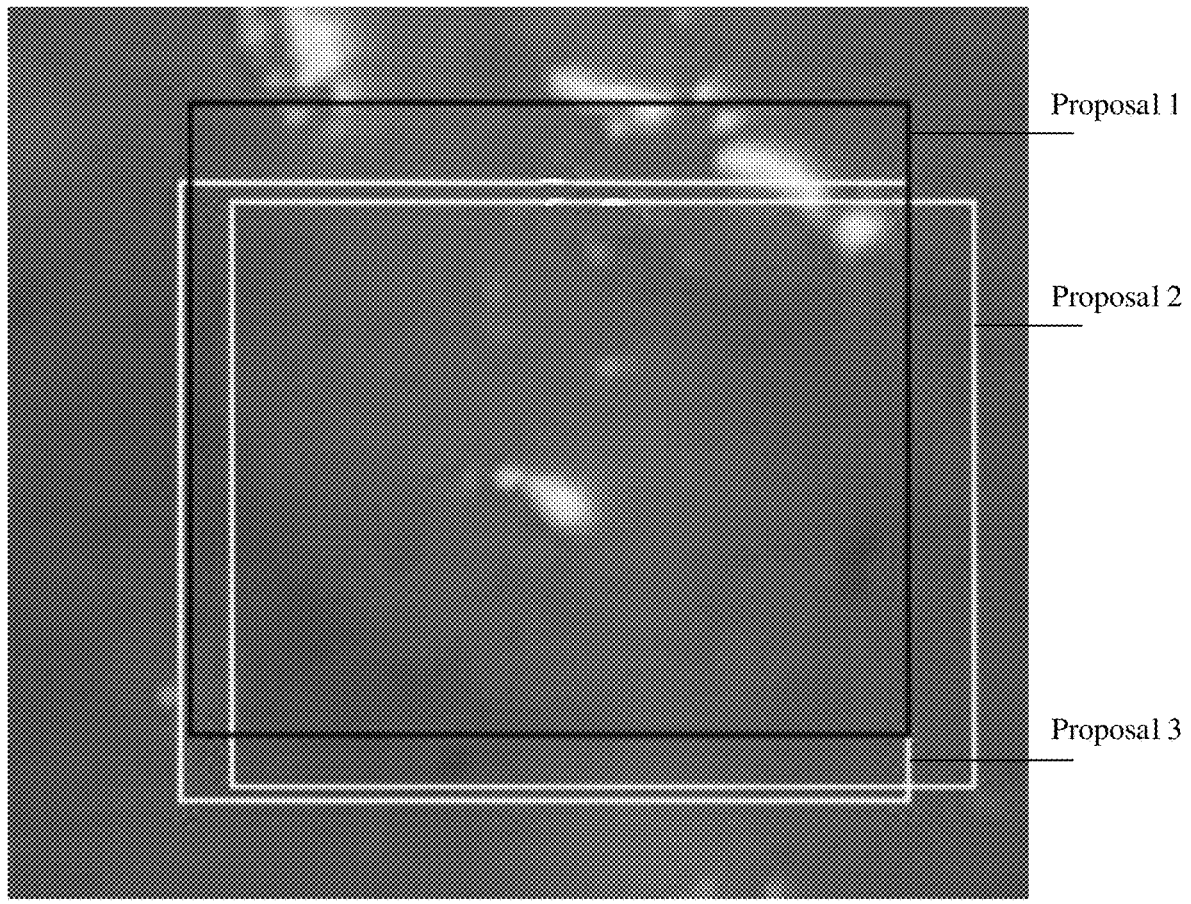
FIG. 8 is a schematic diagram of an abnormality proposal according to an embodiment of this application.

The original NMS algorithm performs sorting, deduplication, and combination in each category, and does not perform cross-category deduplication and combination. Because finely classified types of the polyp dataset are quite confusing, for one polyp region whose type is difficult to distinguish, the model is inclined to generate several different polyp boxes. One example is shown in FIG. 8. To improve actual user experience of a doctor, this application provides the following NMS optimization algorithm.

A similarity condition may be defined as follows: IOU is greater than a particular threshold or a center point falls within a particular region. Based on the foregoing algorithm, only a result with a high confidence level is outputted, which improves actual use experience of a doctor.

Service Optimization 2: Multi-Scale Model Selection Module

Figure 9:
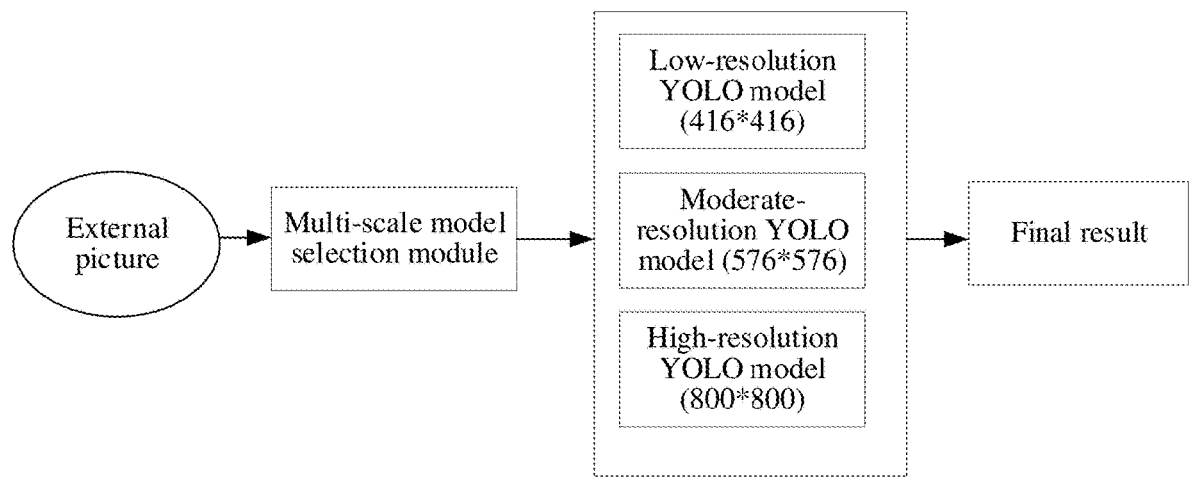
FIG. 9 is a schematic diagram of an abnormality recognition model according to an embodiment of this application.

In a cloud service, in the related art, input images of different sizes are usually inputted into an input layer of a neural network of a fixed size. The applicant after practice finds that a higher degree of proximity of the size of the network input layer to the input of the original picture indicates a higher accuracy and recall rate. Therefore, in this application, a multi-scale model selection module is designed. No transmission error and error amplification occurs in the module, and the end-to-end detection speed is not affected, as shown in FIG. 9.

The model is deployed according to bearing capacity of a server, and needs to be loaded in a video memory. Otherwise, the real-time performance is affected.

In one embodiment of this application, a complete end-to-end colon polyp positioning and property determining solution that is practically applicable to hospitals, a novel anchor box parameter initialization method based on DBSCAN (instead of K-means) (algorithm solution), a cross-category NMS algorithm module (algorithm solution) applicable to a colon polyp, and a multi-scale preload prediction network (service mode) based on picture size adaptive selection are provided. The provided novel anchor box parameter initialization method based on DBSCAN (instead of K-means) can assist initial parameter configuration of YOLO. The provided end-to-end cross-category NMS algorithm module applied to a colon polyp (algorithm solution) improves user experience. According to the provided multi-scale prediction network, a proper network is selected according to a picture size, to improve the final effect.

The end-to-end colon polyp positioning and property determining method provided in this application, by way of advantages of an end-to-end network, resolves problems of information distortion and error amplification caused by a plurality of modules or layers, making it easy to use and maintain. High real-time performance is achieved and the model has high processing efficiency, and can ensure the smoothness of a video frame rate (>40 fps). Certain robustness and anti-noise capacity are achieved, making it adapted to actual production environments of hospitals.

Based on the above, the technical solution of this application is an end-to-end colon detection solution that can be directly applied to a hospital production environment, which, in a current situation where medical resources are scarce and distributed unbalanced, can assist a doctor in discovering and positioning a polyp to avoid a miss during diagnosis; and assist the doctor in determining the property of the polyp to improve the determining accuracy.

It is to be noted that, to make the description simple, the foregoing method embodiments are stated as a series of action combinations. However, a person skilled in the art needs to know that this application is not limited to the described sequence of the actions because according to this application, some steps may use another sequence or may be simultaneously performed. In addition, a person skilled in the art shall also be aware that all the embodiments described in the specification are exemplary embodiments, and the related actions and modules may be optional.

According to the foregoing descriptions of implementations, a person skilled in the art may clearly learn that the method according to the foregoing embodiments may be implemented by using software and a general hardware platform, or certainly may be implemented by using hardware. However, in most cases, the former is a better implementation. Based on such an understanding, one embodiment in this application may be implemented in the form of a software product. The computer software product is stored in a storage medium (for example, a read-only memory (ROM)/random access memory (RAM), a magnetic disk or an optical disc), and includes several instructions for instructing a terminal device (which may be a mobile phone, a computer, a server, a network device or the like) to perform the method described in the embodiments of this application.

Figure 10:
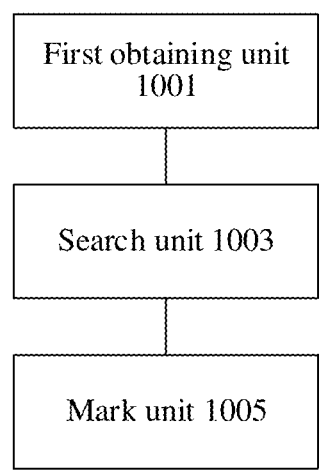
FIG. 10 is a schematic diagram of an image recognition apparatus according to an embodiment of this application.

According to another aspect of the embodiments of this application, an image recognition apparatus configured to implement the image recognition method. FIG. 10 is a schematic diagram of an image recognition apparatus according to an embodiment of this application. As shown in FIG. 10, the apparatus may include: a first obtaining unit 1001, a search unit 1003, and a mark unit 1005.

The first obtaining unit 1001 is configured to obtain a first image.

The search unit 1003 is configured to segment the first image into a plurality of first regions by using a target model, and search for a target region among bounding boxes in the first image that use points in the first regions as centers; the target region being a bounding box in the first image in which a target object is located, the target model being a pre-trained neural network model configured to recognize from an image a region in which the target object is located, and the target model being obtained through training by using positive samples with a region in which the target object is located marked and negative samples with a region in which a noise is located marked.

The mark unit 1005 is configured to mark the target region in the first image.

The first obtaining unit 1001 in this embodiment may be configured to perform step S202 in the embodiments of this application, the search unit 1003 in this embodiment may be configured to perform step S204 in the embodiments of this application, and the mark unit 1005 in this embodiment may be configured to perform step S206 in the embodiments of this application.

Examples implemented by the foregoing modules and corresponding steps and application scenarios of the foregoing modules and corresponding steps are the same, but are not limited to the content disclosed in the foregoing embodiments. The modules may be run in the hardware environment shown in FIG. 1 as a part of the apparatus, and may be implemented through software, or may be implemented through hardware.

With the modules, the first image is segmented into the plurality of first regions by using the target model, the target region is searched for among the bounding boxes in the first image that use points in the first regions as centers, and the target region is marked in the first image, the target region being a bounding box in the first image in which the target object is located. The target model is obtained through training by using the positive samples with a region in which the target object is located marked and the negative samples with a region in which a noise is located marked. Therefore, in the technical solution of this application, the target object in the first image can still be accurately recognized by directly using the target model, even there is a noise, thereby resolving the technical problem of relatively low accuracy of target object detection in the related art, and improving accuracy of target object detection.

The apparatus in this application may further include:
  a second obtaining unit, configured to obtain training images that include the positive samples with a region in which the target object is located marked and the negative samples with a region in which a noise is located marked before the first image is segmented into the plurality of first regions by using the target model and the target region is searched for among the bounding boxes in the first image that use points in the first regions as centers;
  a training unit, configured to train parameters in an original model by using the training images to obtain a recognition model configured to recognize the target object, the recognition model including the target model.

The training unit may include:
a training module, configured to input color data of the training images into the original model, and train the parameters in the original model by using the color data of the training images;
a first validation model, configured to use the trained original model as the recognition model when a second region recognized by the trained original model in a verification image after color data of the verification image is used as an input of the trained original model matches a marked region in the verification image, the second region being recognized by the trained original model in the verification image as a region in which the target object is located, and the marked region being a region marked in the verification image in which the target object is actually located; and
a second validation model, configured to instruct the training module to continue to train, when the second region recognized by the trained original model in the verification image after the color data of the verification image is used as the input of the trained original model does not match the marked region, the parameters in the original model by using color data of the positive samples and color data of the negative samples, until the second region recognized by the trained original model in the verification image after the color data of the verification image is used as the input of the trained original model matches the marked region.

The training module may be further configured to determine image features for describing the target object by using the color data of the training images; and determine values of the parameters in the original model that correspond to a case that in a fully connected layer of the original model, the image features are used as an input and regions in the training images in which the target object is located are used as an output.

The training module may be further configured to obtain a plurality of groups of region parameters corresponding to a plurality of positive samples, each group of region parameters being used for describing a third region marked by mark information in a positive sample in which the target object is located, the region parameters including a first parameter used for representing a center point of the third region, a second parameter used for representing a length of the third region, and a third parameter used for representing a width of the third region; cluster a plurality of second parameters in the plurality of groups of region parameters into a plurality of first datasets, and cluster a plurality of third parameters in the plurality of groups of region parameters into a plurality of second datasets; obtain a fourth parameter in each of the plurality of first datasets and a fifth parameter in each of the plurality of second datasets, the fourth parameter being used for representing a center of the first dataset, and the fifth parameter being used for representing a center of the second dataset; and use the fourth parameter as a parameter in the original model used for representing a length of a recognized region in which the target object is located, and use the fifth parameter as a parameter in the original model used for representing a width of the recognized region in which the target object is located.

The training module may be further configured to obtain a target parameter in the plurality of second parameters in the aspect of clustering a plurality of second parameters in the plurality of groups of region parameters into a plurality of first datasets, the target parameter being an unprocessed second parameter in the plurality of second parameters; and create a parameter set that includes the target parameter and a second parameter associated with the target parameter in the plurality of second parameters when the target parameter is a core parameter, a quantity of second parameters whose distances to the core parameter are within a first threshold being not less than a second threshold.

The training module may be further configured to set values of parameters in a convolutional layer in the original model the same as values of parameters in a convolutional layer in a pre-trained feature extraction model in the aspect of determining image features for describing the abnormal part by using the color data of the training images; and extract the image features for describing the target object from the color data of the training images through the convolutional layer of the original model.

The training unit may be further configured to train the parameters in the original model by using the training images of a plurality of resolutions to obtain a plurality of recognition models corresponding to the plurality of resolutions, each recognition model being obtained through training by using training images of one resolution, and resolutions of training images used during training of any two recognition models being different.

The search unit may be further configured to obtain a plurality of fourth regions found by the target model in all the bounding boxes, the fourth region being recognized by the target model in the first image as a region in which the target object is located; and use, when the plurality of fourth regions include fourth regions whose centers are spaced no more than a third threshold, a region with a highest confidence level in the fourth regions whose centers are spaced no more than the third threshold as a target region, and use a fourth region whose center is spaced from a center of any other fourth region more than the third threshold as a target region.

The search unit may be further configured to select the target model matching a resolution of the first image from the plurality of recognition models, and segment the first image into the plurality of first regions by using the target model.

Examples implemented by the foregoing modules and corresponding steps and application scenarios of the foregoing modules and corresponding steps are the same, but are not limited to the content disclosed in the foregoing embodiments. The modules may be run in the hardware environment shown in FIG. 1 as a part of the apparatus, and may be implemented through software (e.g., developed using a computer programming language), hardware (e.g., processor and/or memory), or a combination thereof. Each module can be implemented using one or more processors (or processors and memory). Likewise, a processor (or processors and memory) can be used to implement one or more modules. Moreover, each module can be part of an overall module that includes the functionalities of the module. The above description may also apply to other equivalent terms such as unit, component, or device. The hardware environment includes a network environment.

According to another aspect of the embodiments of this application, a server or a terminal configured to implement the image recognition method is further provided.

Figure 11:
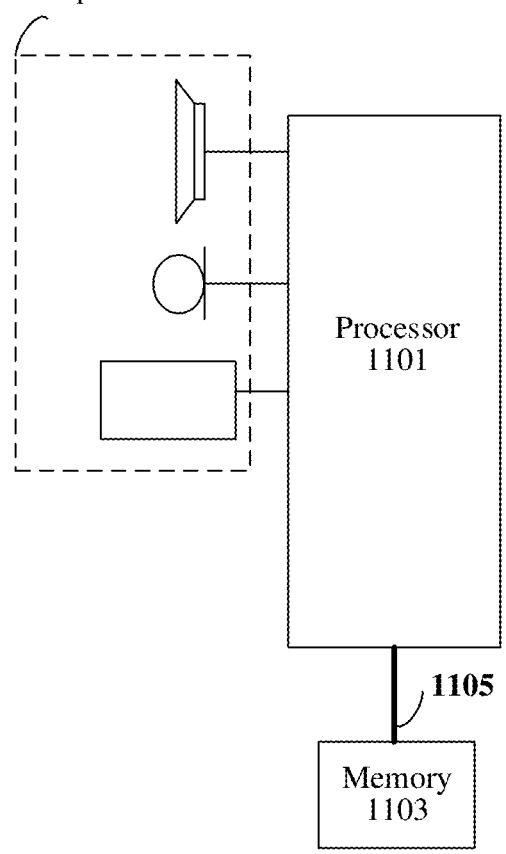
FIG. 11 is a structural block diagram of a terminal according to an embodiment of this application.

FIG. 11 is a structural block diagram of a terminal according to an embodiment of this application. As shown in FIG. 11, the terminal may include: one or more (only one is shown in FIG. 11) processors 1101, a memory 1103, and a transmission apparatus 1105. As shown in FIG. 11, the terminal may further include an input/output device 1107.

The memory 1103 may be configured to store a software program and a module, for example, a program instruction/module corresponding to the image recognition method and apparatus in the embodiments of this application, and the processor 1101 performs various functional applications and data processing by running a software program and a module stored in the memory 1103, that is, implementing the foregoing image recognition method. The memory 1103 may include a high-speed RAM, and may further include a non-volatile memory such as one or more magnetic storage apparatuses, flash memories, or other non-volatile solid-state memories. In some examples, the memory 1103 may further include memories remotely disposed relative to the processor 1101, and these remote memories may be connected to a terminal through a network. Examples of the network include but are not limited to, the Internet, an intranet, a local area network, a mobile communication network, and a combination thereof.

The transmission apparatus 1105 is configured to receive or send data by means of a network, or may further be configured to transmit data between the processor and the memory. An example of the foregoing network may include a wired network and a wireless network. In an example, the transmission apparatus 1105 includes a network interface controller (NIC), and the NIC may be connected to another network device and a router via a network cable to communicate with the Internet or a local area network. In an example, the transmission apparatus 1105 is a radio frequency (RF) module, configured to communicate with the Internet in a wireless manner.

The memory 1103 may be configured to store an application program.

The processor 1101 may invoke, by using the transmission apparatus 1105, the application program stored in the memory 1103, to perform the following steps:

obtaining a first image; and segmenting the first image into a plurality of first regions by using a target model, and searching for a target region among bounding boxes in the first image that use points in the first regions as centers; the target region being a bounding box in the first image in which a target object is located, the target model being a pre-trained neural network model configured to recognize from an image a region in which the target object is located, and the target model being obtained through training by using positive samples with a region in which the target object is located marked and negative samples with a region in which a noise is located marked; and marking the target region in the first image.

In the following examples, reference may be made to the previous examples described above, and details may not be described again.

A person of ordinary skill in the art may understand that the structure shown in FIG. 11 is merely an example, and the terminal may be a terminal device such as a smartphone (for example, an Android mobile phone or an iOS mobile phone), a tablet computer, a palmtop computer, a mobile Internet device (MID), or a PAD. FIG. 11 does not limit the structure of the electronic device. For example, the terminal may further include more or fewer components (for example, a network interface and a display apparatus) than those shown in FIG. 11, or have a configuration different from that shown in FIG. 11.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of this application further provides a storage medium. In this embodiment, the storage medium may be configured to store program code for performing the image recognition method.

In this embodiment, the storage medium may be located in at least one network device in a plurality of network devices in networks shown in the foregoing embodiments.

In this embodiment, the storage medium is configured to store program code for performing the following steps:

obtaining a first image; and segmenting the first image into a plurality of first regions by using a target model, and searching for a target region among bounding boxes in the first image that use points in the first regions as centers; the target region being a bounding box in the first image in which a target object is located, the target model being a pre-trained neural network model configured to recognize from an image a region in which the target object is located, and the target model being obtained through training by using positive samples with a region in which the target object is located marked and negative samples with a region in which a noise is located marked; and marking the target region in the first image.

In the following examples, reference may be made to the previous examples described above, and details may not be described again In this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of this application are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is to be understood that the disclosed client can be implemented in other manners. The described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make several improvements and modifications without departing from the principle of this application, and the improvements and modifications shall fall within the protection scope of this application.

What is claimed is:

1. An image recognition method comprising:
    obtaining a first image;
    obtaining training images that comprise the positive samples with a region in which a target object is located marked and the negative samples with a region in which a noise is located marked;
    training parameters in an original model by using the training images, wherein the operation of training comprises:
        inputting color data of the training images into the original model; and
        training the parameters in the original model by using the inputted color data;
    obtaining a target model from the trained original model, the target model being configured to recognize a target object, wherein a neural network model of the target model is trained by using the positive samples and the negative samples;
    segmenting the first image into a plurality of first regions by using the target model;
    searching for a target region among bounding boxes in the first image that use points in the first regions as centers, wherein the target region comprises a bounding box in the first image in which a target object is located; and
    marking the target region in the first image.

2. The method according to claim 1, wherein the training of the parameters in the original model further comprises:
    using the trained original model as the target model in response to a second region being recognized by the trained original model in a verification image after color data of the verification image is used as an input of the trained original model matches a marked region in the verification image, the second region being recognized by the trained original model in the verification image as a region in which the target object is located, and the marked region being a region marked in the verification image in which the target object is located; and
    continuing to train, in response to the second region being recognized by the trained original model in the verification image after the color data of the verification image is used as the input of the trained original model does not match the marked region, the parameters in the trained original model by using color data of the positive samples and color data of the negative samples, until the second region recognized by the trained original model in the verification image after the color data of the verification image is used as the input of the trained original model matches the marked region.

3. The method according to claim 1, wherein the training the parameters in the original model by using the color data of the training images comprises:
    determining image features for describing the target object by using the color data of the training images; and
    determining values of the parameters in the original model that correspond to when for a fully connected layer of the original model, the image features are used as an input and regions in the training images in which the target object is located are used as an output.

4. The method according to claim 3, wherein the determining image features for describing the target object by using the color data of the training images comprises:
    setting values of parameters in a convolutional layer in the original model to be the same as values of parameters in a convolutional layer in a pre-trained feature extraction model; and
    extracting the image features for describing the target object from the color data of the training images through the convolutional layer of the original model.

5. The method according to claim 1, wherein the training the parameters in the original model by using the color data of the training images comprises:
    obtaining a plurality of groups of region parameters corresponding to a plurality of positive samples, wherein each of the groups of region parameters is used for describing a third region marked in a positive sample in which the target object is located, the region parameters further comprising a first parameter used for representing a center point of the third region, a second parameter used for representing a length of the third region, and a third parameter used for representing a width of the third region;
    clustering a plurality of second parameters in the plurality of groups of region parameters into a plurality of first datasets;
    clustering a plurality of third parameters in the plurality of groups of region parameters into a plurality of second datasets;
    obtaining a fourth parameter in each of the plurality of first datasets and a fifth parameter in each of the plurality of second datasets, the fourth parameter being used for representing a center of the first dataset, and the fifth parameter being used for representing a center of the second dataset; and
    using the fourth parameter as a parameter in the original model for representing a length of a recognized region in which the target object is located;
    using the fifth parameter as a parameter in the original model for representing a width of the recognized region in which the target object is located.

6. The method according to claim 5, wherein the clustering of a plurality of second parameters in the plurality of groups of region parameters into a plurality of first datasets comprises:
    obtaining a target parameter in the plurality of second parameters, the target parameter being an unprocessed second parameter in the plurality of second parameters; and
    creating a parameter set that comprises the target parameter and a second parameter associated with the target parameter in the plurality of second parameters wherein the target parameter is a core parameter, and wherein a quantity of second parameters whose distances to the core parameter are within a first threshold are not less than a second threshold.

7. The method according to claim 5, wherein the searching for a target region among bounding boxes in the first image that use points in the first regions as centers comprises:
obtaining a plurality of fourth regions found by the target model in all the bounding boxes, the fourth region being recognized by the target model in the first image as a region in which the target object is located; and
using, in response to the plurality of fourth regions comprising fourth regions whose centers are spaced not more than a third threshold, a region with a higher confidence level in the fourth regions whose centers are spaced not more than the third threshold as a target region, and using a fourth region whose center is spaced from a center of any other fourth region more than the third threshold as a target region.

8. The method according to claim 1, wherein the training of the parameters in the original model further comprises:
training the parameters in the original model by using the training images of a plurality of resolutions to obtain a plurality of target models corresponding to the plurality of resolutions, each target model being obtained through training by using training images of one resolution, and resolutions of training images used during training of any two target models being different.

9. The method according claim 1, wherein the segmenting the first image into a plurality of first regions further comprises:
selecting the target model matching a resolution of the first image from the plurality of target models, and segmenting the first image into the plurality of first regions by using the target model.

10. An electronic device, comprising a memory, a processor, and a computer program that is stored in the memory and executable on the processor, the processor performing the method according to claim 1 by using the computer program.

11. An image recognition system, comprising an image shooting device and an image recognition device, the image recognition device being configured to perform the method according to claim 1.

12. An electronic image recognition device comprising:
a processor; and
a memory, configured to store executable instructions of the processor, the processor being configured to execute the executable instructions to implement operations comprising:
obtaining a first image;
obtaining training images that comprise the positive samples with a region in which the target object is located marked and that comprise the negative samples with a region in which a noise is located marked;
training parameters in an original model by:
inputting color data of the training images into the original model; and
training the parameters in the original model by using the color data of the training images;
obtaining a target model from the trained original model, the target model being configured to recognize a target object, wherein a neural network model of the target model is trained by using the positive samples and the negative samples;
segmenting the first image into a plurality of first regions by using a target model;
searching for a target region among bounding boxes in the first image that use points in the first regions as centers, wherein the target region comprises a bounding box in the first image in which a target object is located; and
marking the target region in the first image.

13. The electronic image recognition device according to claim 12, wherein the training further comprises:
using the trained original model as the target model in response to a second region being recognized by the trained original model in a verification image after color data of the verification image is used as an input of the trained original model matches a marked region in the verification image, wherein the second region is recognized by the trained original model in the verification image as a region in which the target object is located, and the marked region is a region marked in the verification image in which the target object is located; and
providing instructions to continue the training, in response to the second region being recognized by the trained original model in the verification image after the color data of the verification image is used as the input of the trained original model does not match the marked region, the parameters in the original model by using color data of the positive samples and color data of the negative samples, until the second region recognized by the trained original model in the verification image after the color data of the verification image is used as the input of the trained original model matches the marked region.

14. The electronic image recognition device according to claim 12,
wherein the training the parameters in the original model by using the color data of the training images comprises:
determining image features for describing the target object by using the color data of the training images; and
determining values of the parameters in the original model that correspond to when for a fully connected layer of the original model, the image features are used as an input and regions in the training images in which the target object is located are used as an output.

15. The electronic image recognition device according to claim 12, wherein the training the parameters in the original model by using the color data of the training images comprises:
obtaining a plurality of groups of region parameters corresponding to a plurality of positive samples, wherein each of the groups of region parameters is used for describing a third region marked in a positive sample in which the target object is located, the region parameters further comprising a first parameter used for representing a center point of the third region, a second parameter used for representing a length of the third region, and a third parameter used for representing a width of the third region;
clustering a plurality of second parameters in the plurality of groups of region parameters into a plurality of first datasets;

clustering a plurality of third parameters in the plurality of groups of region parameters into a plurality of second datasets;

obtaining a fourth parameter in each of the plurality of first datasets and a fifth parameter in each of the plurality of second datasets, the fourth parameter being used for representing a center of the first dataset, and the fifth parameter being used for representing a center of the second dataset; and using the fourth parameter as a parameter in the original model for representing a length of a recognized region in which the target object is located;

using the fifth parameter as a parameter in the original model for representing a width of the recognized region in which the target object is located.

16. The electronic image recognition device according to claim 12, wherein the training of the parameters in the original model further comprises:

training the parameters in the original model by using the training images of a plurality of resolutions to obtain a plurality of target models corresponding to the plurality of resolutions, each target model being obtained through training by using training images of one resolution, and resolutions of training images used during training of any two target models being different.

17. A non-transitory, computer readable storage medium, comprising a computer program stored therein, the computer program, when run, performing:

obtaining a first image;

obtaining training images that comprise the positive samples with a region in which the target object is located marked and the negative samples with a region in which a noise is located marked; and training parameters in an original model by:
  inputting color data of the training images into the original model; and
  training the parameters in the original model by using the inputted color data of the training images;

obtaining a target model from the trained original model, the target model being configured to recognize a target object, wherein a neural network model of the target model is trained by using the positive samples and the negative samples;

segmenting the first image into a plurality of first regions by using a target model;

searching for a target region among bounding boxes in the first image that use points in the first regions as centers, wherein the target region comprises a bounding box in the first image in which a target object is located; and marking the target region in the first image.

18. The non-transitory, computer readable storage medium according to claim 17, wherein the training of the parameters in the original model further comprises:

using the trained original model as the target model in response to a second region being recognized by the trained original model in a verification image after color data of the verification image is used as an input of the trained original model matches a marked region in the verification image, the second region being recognized by the trained original model in the verification image as a region in which the target object is located, and the marked region being a region marked in the verification image in which the target object is located; and continuing to train, in response to the second region being recognized by the trained original model in the verification image after the color data of the verification image is used as the input of the trained original model does not match the marked region, the parameters in the original model by using color data of the positive samples and color data of the negative samples, until the second region recognized by the trained original model in the verification image after the color data of the verification image is used as the input of the trained original model matches the marked region.

19. The non-transitory, computer readable storage medium according to claim 18, wherein the training the parameters in the original model by using the color data of the training images comprises:

determining image features for describing the target object by using the color data of the training images; and determining values of the parameters in the original model that correspond to when for a fully connected layer of the original model, the image features are used as an input and regions in the training images in which the target object is located are used as an output.

20. The non-transitory, computer readable storage medium according to claim 18, wherein the training the parameters in the original model by using the color data of the training images comprises:

obtaining a plurality of groups of region parameters corresponding to a plurality of positive samples, wherein each of the groups of region parameters is used for describing a third region marked in a positive sample in which the target object is located, the region parameters further comprising a first parameter used for representing a center point of the third region, a second parameter used for representing a length of the third region, and a third parameter used for representing a width of the third region;

clustering a plurality of second parameters in the plurality of groups of region parameters into a plurality of first datasets;

clustering a plurality of third parameters in the plurality of groups of region parameters into a plurality of second datasets;

obtaining a fourth parameter in each of the plurality of first datasets and a fifth parameter in each of the plurality of second datasets, the fourth parameter being used for representing a center of the first dataset, and the fifth parameter being used for representing a center of the second dataset; and using the fourth parameter as a parameter in the original model for representing a length of a recognized region in which the target object is located;

using the fifth parameter as a parameter in the original model for representing a width of the recognized region in which the target object is located.

21. The non-transitory, computer readable storage medium according to claim 17, wherein the training the parameters in the original model by using the color data of the training images comprises:

determining image features for describing the target object by using the color data of the training images; and determining values of the parameters in the original model that correspond to when for a fully connected layer of the original model, the image features are used as an input and regions in the training images in which the target object is located are used as an output.

22. The non-transitory, computer readable storage medium according to claim 17, wherein the training the parameters in the original model by using the color data of the training images comprises:

obtaining a plurality of groups of region parameters corresponding to a plurality of positive samples, wherein each of the groups of region parameters is used for describing a third region marked in a positive sample in which the target object is located, the region parameters further comprising a first parameter used for representing a center point of the third region, a second parameter used for representing a length of the third region, and a third parameter used for representing a width of the third region;

clustering a plurality of second parameters in the plurality of groups of region parameters into a plurality of first datasets;

clustering a plurality of third parameters in the plurality of groups of region parameters into a plurality of second datasets;

obtaining a fourth parameter in each of the plurality of first datasets and a fifth parameter in each of the plurality of second datasets, the fourth parameter being used for representing a center of the first dataset, and the fifth parameter being used for representing a center of the second dataset; and using the fourth parameter as a parameter in the original model for representing a length of a recognized region in which the target object is located;

using the fifth parameter as a parameter in the original model for representing a width of the recognized region in which the target object is located.

23. The non-transitory, computer readable storage medium according to claim 17, wherein the training of the parameters in the original model further comprises:

training the parameters in the original model by using the training images of a plurality of resolutions to obtain a plurality of target models corresponding to the plurality of resolutions, each target model being obtained through training by using training images of one resolution, and resolutions of training images used during training of any two target models being different.

* * * * *